United States Patent

Hayashi et al.

(10) Patent No.: US 6,805,401 B2
(45) Date of Patent: Oct. 19, 2004

(54) VEHICLE FLOOR STRUCTURE

(75) Inventors: Naoki Hayashi, Wako (JP); Toshizumi Yamaguchi, Wako (JP); Satoru Kawabe, Wako (JP); Toshihiko Sato, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/346,984

(22) Filed: Jan. 13, 2003

(65) Prior Publication Data

US 2003/0137163 A1 Jul. 24, 2003

(30) Foreign Application Priority Data

Jan. 23, 2002 (JP) ....................................... 2002-014661

(51) Int. Cl.[7] .............................................. B62D 25/20
(52) U.S. Cl. .............. 296/204; 296/187.08; 296/193.07
(58) Field of Search ...................... 296/187.01, 187.03, 296/187.08, 193.01, 193.07, 203.01, 204

(56) References Cited

U.S. PATENT DOCUMENTS

| 2,216,670 | A | * | 10/1940 | Klavik | .................. 296/193.07 |
| 3,034,823 | A | * | 5/1962 | Himka et al. | ................ 296/204 |
| 5,002,333 | A | * | 3/1991 | Kenmochi et al. | ........... 296/204 |
| 5,462,144 | A | * | 10/1995 | Guardiola et al. | ........... 188/377 |
| 5,806,918 | A | * | 9/1998 | Kanazawa | .................... 296/204 |
| 6,679,546 | B2 | * | 1/2004 | Mishima et al. | ........ 296/203.01 |
| 2001/0030450 | A1 | * | 10/2001 | Miyasaka | .................... 296/204 |
| 2003/0137163 | A1 | * | 7/2003 | Hayashi et al. | .............. 296/204 |
| 2004/0100126 | A1 | * | 5/2004 | Kawabe et al. | ......... 296/193.07 |

FOREIGN PATENT DOCUMENTS

| EP | 298903 A2 | * | 1/1989 | .................. 296/204 |
| JP | 63-232083 A | * | 9/1988 | .................. 296/204 |
| JP | 04-081372 A | * | 3/1992 | .............. 296/65.09 |
| JP | 10-338170 | | 12/1998 | |

* cited by examiner

Primary Examiner—D. Glenn Dayoan
Assistant Examiner—Paul Chenevert
(74) Attorney, Agent, or Firm—Merchant & Gould, P.C.

(57) ABSTRACT

A vehicle floor structure with a floor body provided to a body frame is provided. The floor body is a hollow panel integrally formed by arranging a plurality of core materials with spaces on a flat plate and placing another flat plate over the core materials. In order to increase the rigidity of the entire floor body, core materials in edge portions of the floor body are joined to the body frame.

16 Claims, 10 Drawing Sheets

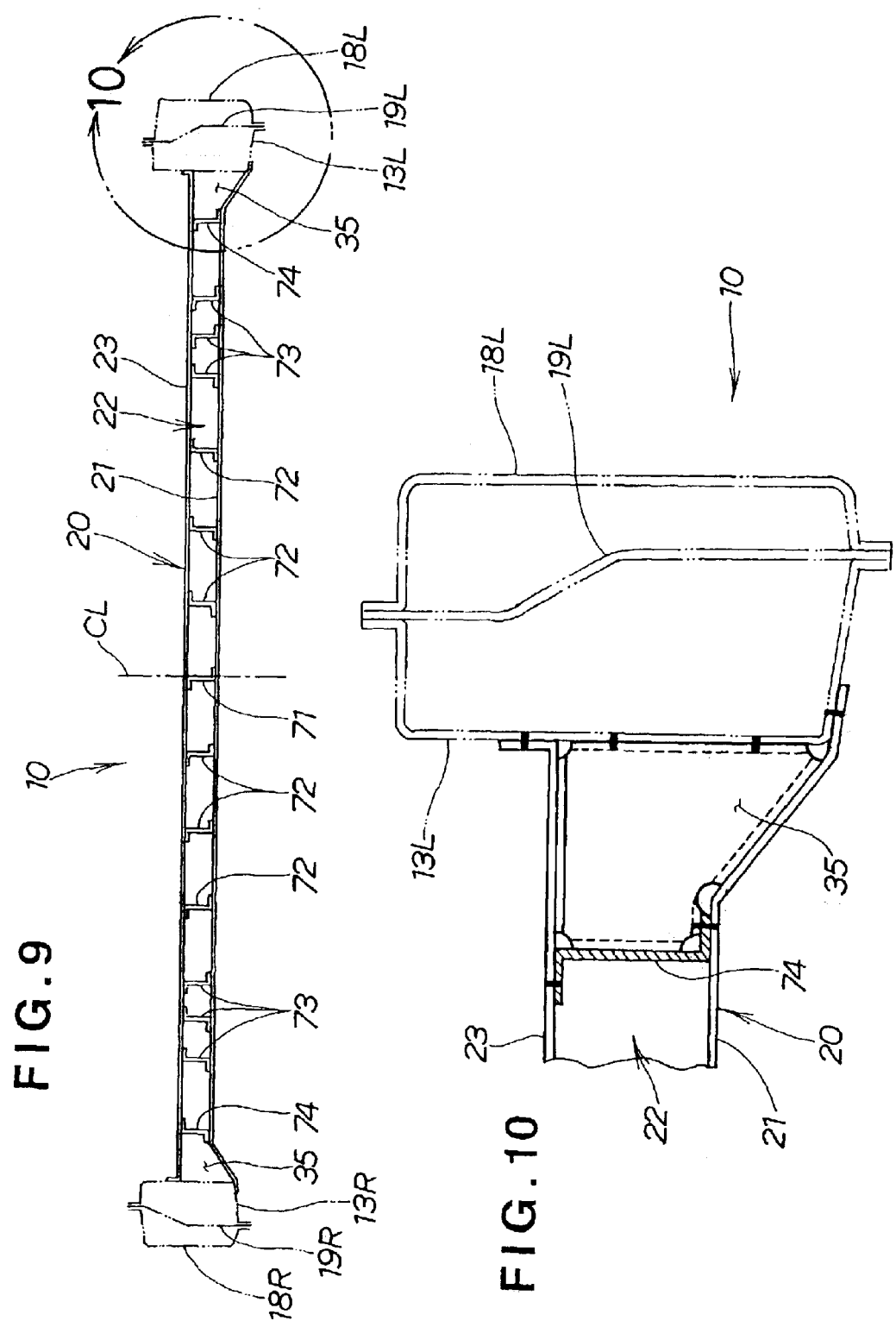

VEHICLE FLOOR STRUCTURE

FIELD OF THE INVENTION

The present invention relates to an improvement in a vehicle floor structure.

BACKGROUND OF THE INVENTION

A vehicle floor is a floor panel provided in the midsection of a body frame, to face a vehicle compartment. A floor panel has a front floor panel and a rear floor panel. A floor panel generally consists of one or two press-molded steel plates. To ensure required rigidity, a structure of reinforcing it with a floor frame is therefore used.

In recent years, studies to increase the rigidity of the floor panel have proceeded. As such an art of the vehicle floor structure, Japanese Patent Laid-Open Publication No. HEI-10-338170 "Method of Mounting Honeycomb Plate to Vehicle Floor" is known, for example.

The above conventional art provides a structure in which fixing melting sheets are laid on the bottom surfaces of a plurality of recesses formed on a floor panel, into which recesses honeycomb plates are fitted from above, and flat substrates integrally provided on the top surfaces of the honeycomb plates are fixed to the brims of the recesses. The rigidity of the floor panel is increased by the honeycomb plates.

Although being able to partially increase the rigidity of the floor panel, the above conventional art does not entirely increase the rigidity of the floor panel. It is thus necessary to reinforce the floor panel with reinforcing members such as a plurality of front crossmembers and a plurality of rear crossmembers. In order to increase the degree of freedom in the layout of attachments (such as an exhaust system) to a vehicle body, it is preferable to reduce the number of reinforcing members. Thus desired is a floor structure being able to entirely increase the rigidity of a floor panel without being provided with a floor frame for reinforcing the floor panel and to efficiently absorb impact energy when an impact force acts on the floor panel.

SUMMARY OF THE INVENTION

According to the present invention, there is provided a vehicle floor structure, which comprises: a body frame; and a floor body of a hollow panel having a first flat plate, a plurality of core materials arranged with spaces on the first flat plate, and a second flat plate placed over the core materials; wherein, core materials in edge portions of the floor body are joined to the body frame.

The use of a hollow panel integrally formed by spacing a plurality of core materials on a flat plate and placing another flat plate thereover, as a floor body, can increase the rigidity and strength of the entire floor against bending, torsion and shearing. Furthermore, joining core materials in edge portions of the floor body to a body frame further increase the rigidity of the entire floor body. The entire floor body is thus increased in rigidity without being provided with a floor frame consisting of additional members for reinforcing the floor body. The elimination of a floor frame can further increase the degree of freedom in the layout of attachments (such as an exhaust system) to the vehicle body.

Impact forces acting through the body frame on the floor body are efficiently dispersed all over the floor body with the core materials spaced from one another between the upper and lower flat plates, so that the floor body as a whole can sufficiently absorb impact energy. The floor body has an increased efficiency in impact energy absorption.

The dispersion of impact forces with the core materials prevents the concentration of excessive stress on a part of the floor body.

The arrangement of the core materials largely increases the strength of the upper and lower flat plates against buckling, increasing the proof stress of the floor body and the vehicle compartment (cabin), increasing the amount of deformation of side frames, and resulting in an increased energy absorption efficiency.

The use of the hollow panel as the floor body and the arrangement of the core materials in the floor body increase equally the surface rigidity of the floor body and eliminate any locally-greatly-vibrating area. The vibration of the floor body can thus be further reduced.

According to the present invention, there is further provided a vehicle floor structure, which comprises; left and right front side frames extending rearward from the vehicle front; and a floor body of a hollow panel having a first flat plate, a plurality of core materials arranged with spaces on the first flat plate, and a second flat plate placed over the core materials; wherein, the front of the floor body is connected to the rear ends of the left and right front side frames, and the core materials in a front edge portion of the floor body are arranged to extend radially rearward directly or indirectly from the rear ends of the left and right front side frames.

The use of a hollow panel integrally formed by spacing a plurality of core materials on a flat plate and placing another flat plate thereover, as a floor body, can increase the rigidity and strength of the entire floor against bending, torsion and shearing. Furthermore, joining core materials in edge portions of the floor body to a body frame further increase the rigidity of the entire floor body. The entire floor body is thus increased in rigidity without being provided with a floor frame consisting of additional members for reinforcing the floor body. The elimination of a floor frame can further increase the degree of freedom in the layout of attachments (such as an exhaust system) to the vehicle body.

Arranging core materials in a front edge portion of the floor body to extend radially rearward directly or indirectly from the rear ends of the left and right front side frames allows an impact force from forward of the vehicle body to be efficiently dispersed all over the floor body. The floor body as a whole can thus sufficiently absorb impact energy. The floor body has an increased efficiency in impact energy absorption.

In the present invention, the core materials preferably include a plurality of longitudinal core materials extending longitudinally and arranged side by side in the vehicle transverse direction, and, among the longitudinal core materials, the arrangement pitch of longitudinal core materials substantially corresponding to the rear ends of the left and right front side frames is set smaller than the arrangement pitch of the other longitudinal core materials.

That is, the strength of only the longitudinal core materials substantially corresponding to the rear ends of the front side frames is increased and the strength of the other longitudinal cores is left unchanged. Balanced setting of the respective strengths of the longitudinal core materials with a limited increase in weight of the floor body can increase the strength of the entire floor body against an impact force from forward of the vehicle body acting through the left and front side frames on the front of the floor body.

Further, in the present invention, the core materials are preferably formed by bending plate materials, and, among the bent plate materials, the plate thickness of bent plate materials extending longitudinally, substantially corresponding to the rear ends of the left and right front side frames, is set larger than the plate thickness of the other bent plate materials.

That is, the plate thickness of only the bent plate materials substantially corresponding to the rear ends of the front side frames is set larger to further increase the strength of the bent plate materials. The strength of the other longitudinal core materials is left unchanged. Balanced setting of the respective strengths of the longitudinal core materials with a limited increase in weight of the floor body can increase the strength of the entire floor body against an impact force from forward of the vehicle body acting through the left and right side frames on the front of the floor body.

BRIEF DESCRIPTION OF THE DRAWINGS

Preferred embodiments of the present invention will be described in detail below, by way of example only, with reference to the accompanying drawings, in which:

FIG. 9 is a cross-sectional front view of the floor body according to the invention;

FIG. 10 is an enlarged view of a portion 10 in FIG. 9;

DETAILED DESCRIPTION OF THE PREFERRED EMBODIMENTS

Figure 1:
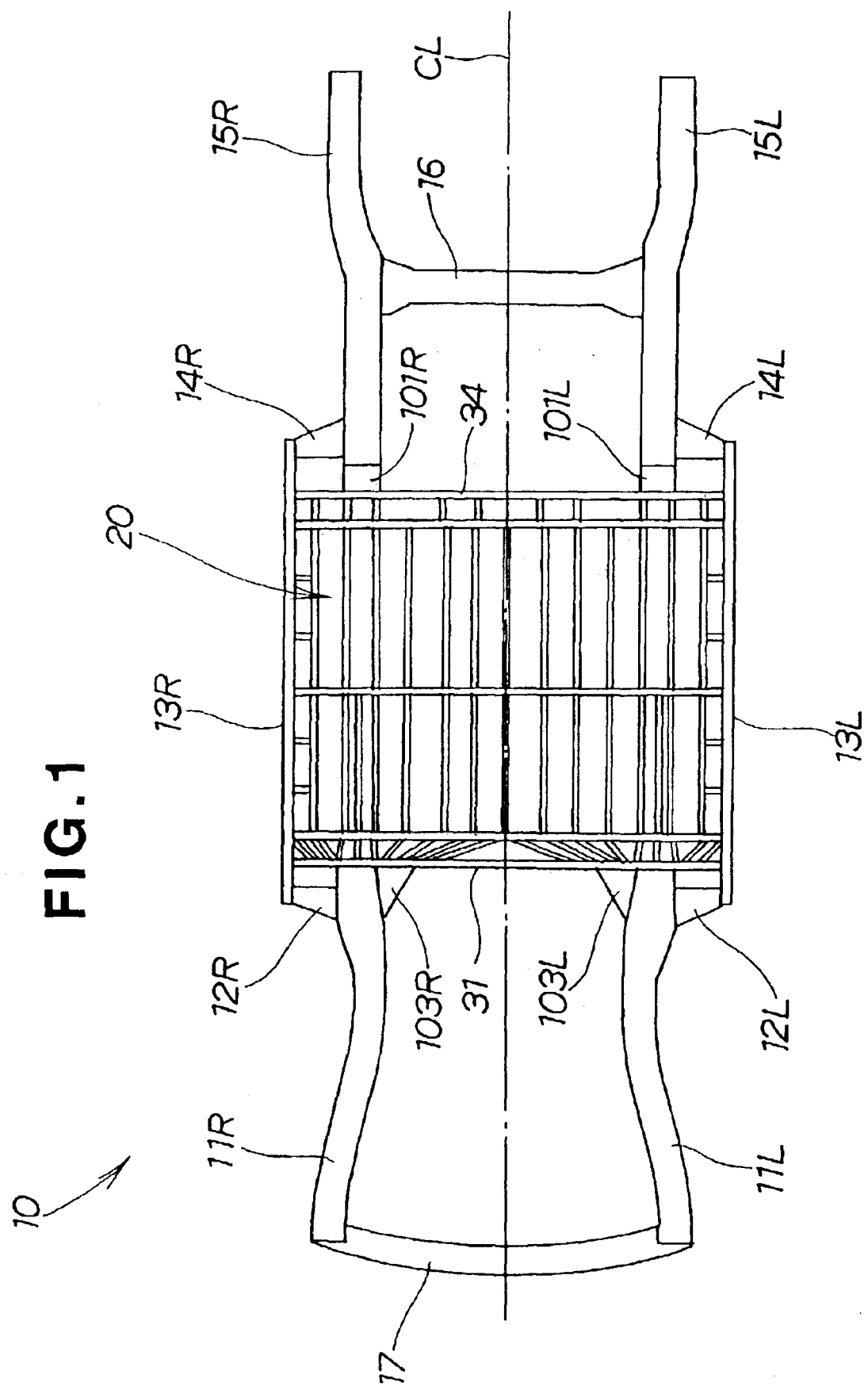
FIG. 1 is a plan view of a body frame according to the present invention.

Initial reference is made to FIG. 1 illustrating an entire body frame according to the present invention. The body frame 10 includes left and right front side frames 11L, 11R extending rearward from the front of the vehicle body, left and right side outriggers 12L, 12R joined to the rear ends of the front side frames 11L, 11R, left and right side sills 13L, 13R joined to rear portions of the side outriggers 12L, 12R, extending rearward, left and right rear side frames 15L, 15R joined to the rear ends of the side sills 13L, 13R via left and right coupling members 14L, 14R, extending rearward, and a rear crossmember 16 extended between the rear side frames 15L, 15R.

A bumper beam 17 is extended between the front ends of the left and right front side frames 11L, 11R. The space between the left and right side sills 13L, 13R is greater than the space between the left and right front side frames 11L, 11R and the space between the left and right rear side frames 15L, 15R.

The body frame 10 has a floor body 20 in the midsection to face the vehicle compartment not shown. The floor body 20 constitutes a front floor panel facing a front portion of the vehicle compartment.

Figure 2:
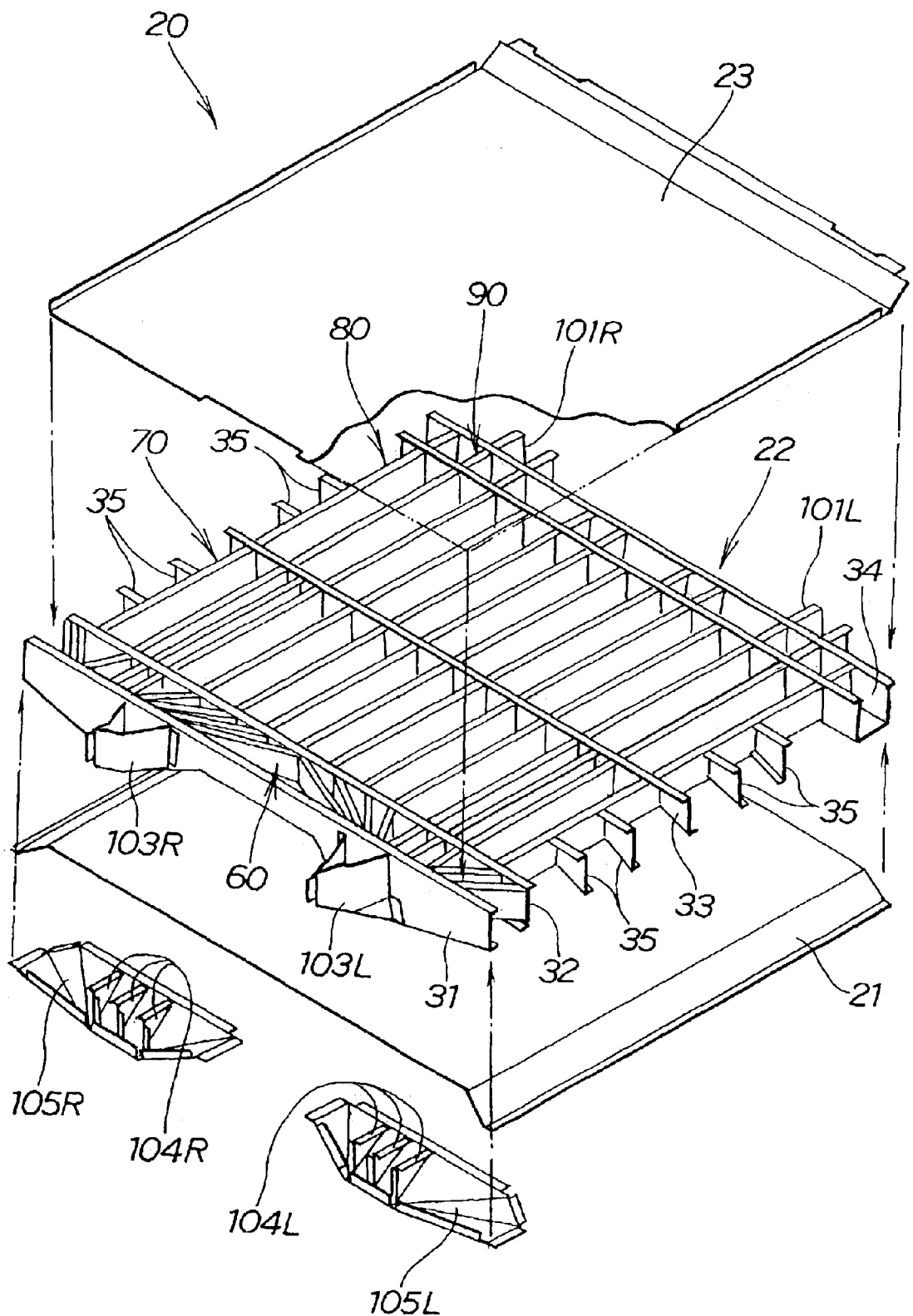
FIG. 2 is an exploded view of a floor body according to the invention.

As shown in FIG. 2, the floor body 20 consists of a hollow panel integrally formed by arranging a plurality of core materials 22 with spaces on a lower flat panel 21 and placing another flat panel, an upper flat panel 23, thereover.

Figure 3:
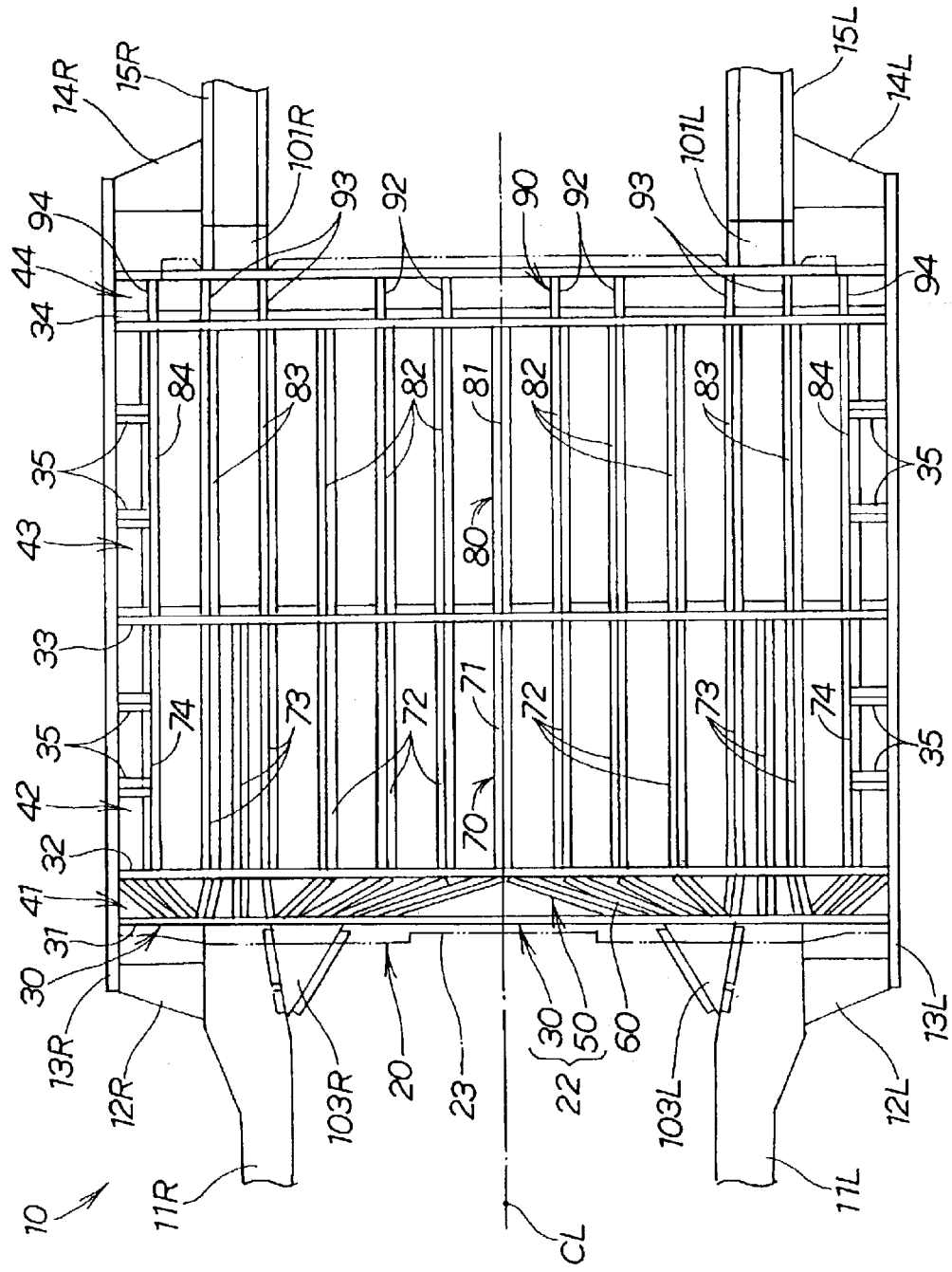
FIG. 3 is a plan view of the floor body according to the invention.

As shown in FIG. 3, the floor body 20 is a quadrangular member in a plan view enclosed with the rear ends of the left and right front side frames 11L, 11R, the left and right side sills 13L, 13R and the front ends of the left and right rear side frames 15L, 15R.

The core materials 22 are formed by bending plate materials, including a plurality of cross core materials 30 extending in the vehicle transverse direction, being arranged side by side in the vehicle longitudinal direction, and a plurality of longitudinal core materials 50 extending in the vehicle longitudinal direction, being arranged side by side in the vehicle transverse direction. The cross core materials 30 and the longitudinal core materials 50 are combined in a lattice in a plan view.

The cross core materials 30 include a first cross core material 31 in a front edge portion of the floor body 20, a second cross core material 32 spaced rearward of the first cross core material 31, a third cross core material 33 in the vehicle longitudinal center and a fourth cross core material 34 in a rear edge portion of the floor body 20.

The fourth cross core material 34 is a member with a so-called "hat-shaped" cross section with a flange formed at the U-shaped opening edge in a side sectional view.

The longitudinal core materials 50 include eighteen longitudinal core materials 60 interposed in a first section 41 between the first cross core material 31 and the second cross core material 32, fifteen longitudinal core materials 70 interposed in a second section 42 between the second cross core material 32 and the third cross core material 33, thirteen longitudinal core materials 80 interposed in a third section 43 between the third cross core material 33 and the fourth cross core material 34, and ten longitudinal core materials 90 interposed in a fourth section 44 within the fourth cross core material 34.

The longitudinal core materials 60 in the first section 41 are joined to the longitudinal core materials 70 in the second section 42 via the second cross core material 32. The longitudinal core materials 70 in the second section 42 are joined to the longitudinal core materials 80 in the third section 43 via the third cross core material 33. The longitudinal core materials 80 in the third section 43 are connected to the longitudinal core materials 90 in the fourth section 44 via the fourth cross core material 34.

The eighteen longitudinal core materials 60 in the first section 41 radially extend rearward from the rear ends of the left and right front side frames 11L, 11R and the vicinity thereof. The details of the longitudinal core materials 60 in the first section 41 will be described later.

The fifteen longitudinal core materials 70 in the second section 42 include a second-section first-longitudinal core material 71 in the transverse center, left and right second-section second-longitudinal core materials 72 arranged on the opposite sides of the second-section first-longitudinal core material 71, three on each side in the vehicle transverse direction, left and right second-section third-longitudinal core materials 73 arranged, three on each side, transversely outward of the left and right second-section second-longitudinal core materials 72, and left and right second-section fourth-longitudinal core materials 74 arranged, one on each side, transversely outward of the left and right second-section third-longitudinal core materials 73.

The left and right second-section third-longitudinal core materials 73 are positioned substantially corresponding to the rear ends of the left and right front side frames 11L, 11R.

The thirteen longitudinal core materials 80 in the third section 43 include a third-section first-longitudinal core material 81 strung with the rear end of the second-section first-longitudinal core material 71, third-section second-longitudinal core materials 82 strung with the rear ends of the second-section second-longitudinal core materials 72, third-section third-longitudinal core materials 83 strung with the rear ends of the left two and right two except the center ones of the left three and right three second-section third-longitudinal core materials 73, and third-section fourth-longitudinal core materials 84 strung with the rear ends of the second-section fourth-longitudinal core materials 74.

The ten longitudinal core materials 90 in the fourth section 44 include fourth-section second-longitudinal core materials 92 strung with the rear ends of the innermost left two and right two of the left three and right three third-section second-longitudinal core materials 82, left two and right two fourth-section third-longitudinal core materials 93 strung with the rear ends of the third-section third-longitudinal core materials 83, and left and right fourth-section fourth-longitudinal core materials 94 strung with the rear ends of the left and right third-section fourth-longitudinal core materials 84.

The left two and right two fourth-section third-longitudinal core materials 93 are joined to the front ends of the left and right rear side frames 15L, 15R via the fourth cross core material 34 and left and right joining members 101L, 101R.

The core materials 22 include a plurality of (e.g., four on each side in an example shown) fifth cross core materials (i.e., coupling core materials) 35 extending transversely outward from the left and right second-section fourth-longitudinal core materials 74 and the left and right third-section fourth-longitudinal core materials 84. The fifth cross core materials 35 are in left and right edge portions of the floor body 20, being joined at their front ends to the left and right side sills 13L, 13R.

In this manner, a plurality of core materials in left and right edge portions of the floor body 20, the fifth cross core materials 35, are joined to the body frame 10.

Figure 4:
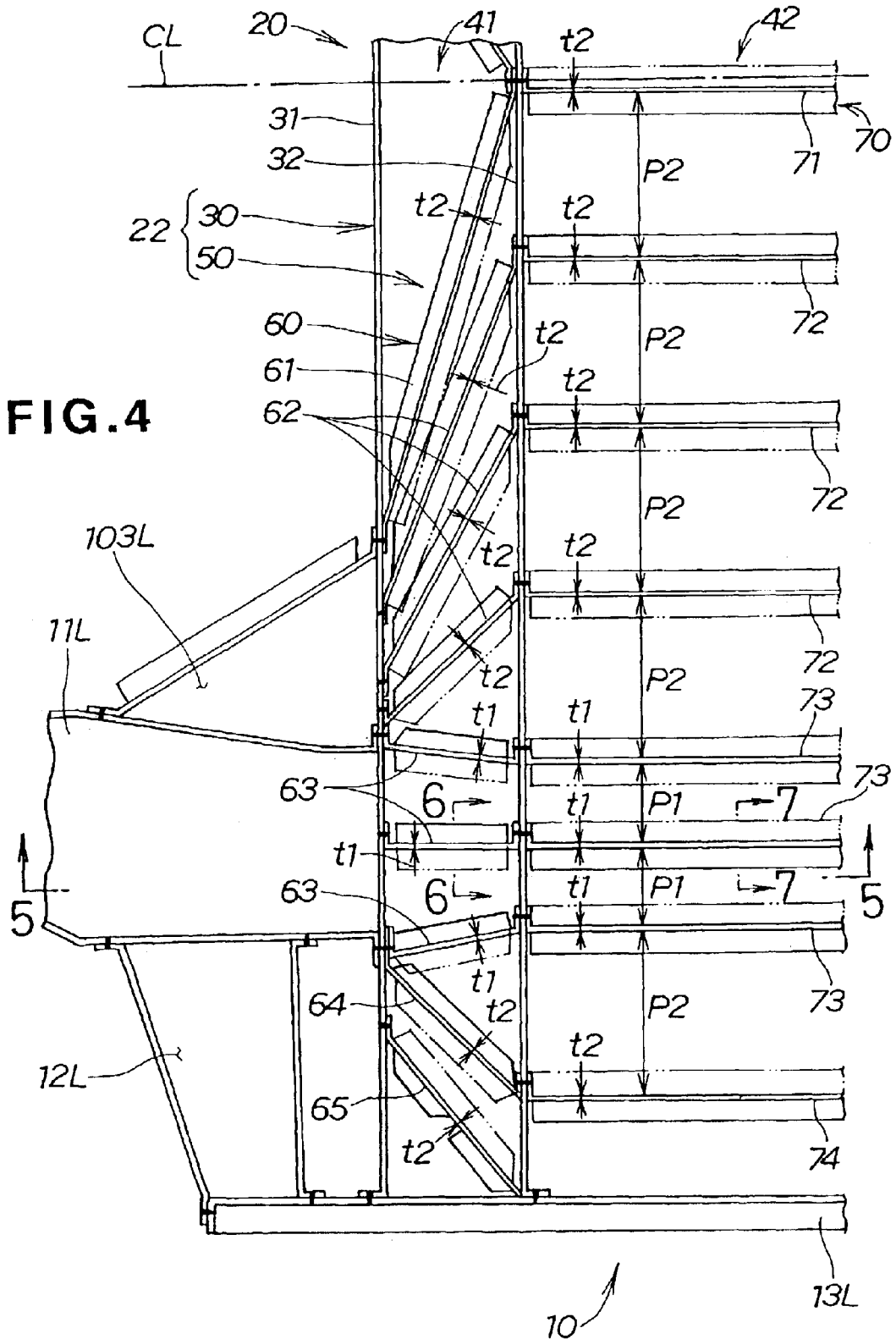
FIG. 4 is a plan view of a left front portion of the floor body according to the invention, illustrating a joined state of the left front portion of the floor body to the rear end of a left front side frame.

FIG. 4 is a plan view of a left front portion of the floor body according to the present invention, illustrating a joined state of the left front portion of the floor body 20 to the rear end of the left front side frame 11L.

The rear end of the left front side frame 11L is joined directly and also via a support member 103L in a triangular shape in a plan view to the first cross core material 31. The support member 103L serves as a reinforcing member for preventing the front side frame 11L from transversely bending and also as a dispersing member for dispersing an impact force acting from forward of the vehicle body through the front side frame 11L on the front of the floor body 20.

The present invention is characterized in that a plurality of core materials in a front edge portion of the floor body 20, the longitudinal core materials 60 in the first section 41, are arranged to radially extend rearward from the rear end of the left front side frame 11L directly or indirectly via the first cross core material 31. In this manner, a plurality of core materials in a front edge portion of the floor body 20, the longitudinal core materials 60, can be joined to the body frame 10.

More specifically, the longitudinal core materials 60 in the first section 41 include a first-section first-longitudinal core material 61 extending from the rear end of the support member 103L to the front end of the second-section first-longitudinal core material 71, three first-section second-longitudinal core materials 62 extending from the rear end of the support member 103L to the front ends of the three second-section second-longitudinal core materials 72, three first-section third-longitudinal core materials 63 extending from the rear end of the left front side frame 11L to the front ends of the three second-section third-longitudinal core materials 73, a first-section fourth-longitudinal core material 64 extending from the rear end of the left front side frame 11L to the front end of the second-section fourth-longitudinal core material 74, and a first-section fifth-longitudinal core material 65 extending from a vicinity of the rear end of the left front side frame 11L to the left end of the second cross core material 32.

An arrangement pitch P1 of the three second-section third-longitudinal core materials 73 substantially corresponding to the rear end of the left front side frame 11L is set smaller than an arrangement pitch P2 of the other longitudinal core materials 71, 72 and 74 in the second section 42 (P1<P2). In addition, a plate thickness t1 of the second-section third-longitudinal core materials 73 is set greater than a plate thickness t2 of the other longitudinal core materials 71, 72 and 74 in the second-section 42 (t1>t2).

Correspondingly, among the longitudinal core materials 60 in the first section 41, an arrangement pitch of the three first-section third-longitudinal core materials 63 substantially corresponding to the rear end of the left front side frame 11L is set smaller than an arrangement pitch of the other longitudinal core materials 61, 62, 64 and 65. In addition, a plate thickness t1 of the three first-section third-longitudinal core materials 63 is set greater than a plate thickness t2 of the other longitudinal core materials 61, 62, 64 and 65 in the first section 41 (t1>t2).

The joint configuration between the rear end of the right front side frame 11R (See FIG. 3) and a right front portion of the floor body 20 and the configurations of the longitudinal core materials 60 in the first section 41 and the longitudinal core materials 70 in the second section 42 are identical to those on the left side described above, and will not be described.

Figure 5:
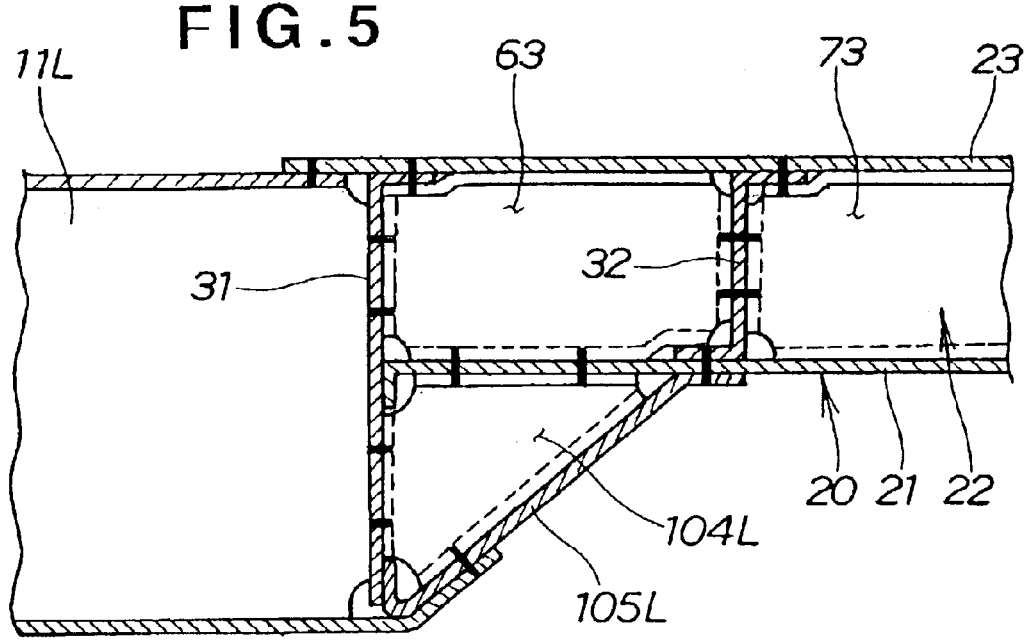
FIG. 5 is a cross-sectional view along line 5—5 in FIG. 4, illustrating a joint between the rear end of the left front side frame and the front of the floor body.

FIG. 5 illustrates in section the joint configuration between the rear end of the left front side frame 11L and the front of the floor body 20.

Since the height of the floor body 20 is smaller than that of the left front side frame 11L, to a joint corner therebetween, gussets 104L in a triangular shape in a side view are applied and joined, and the lower ends of the gussets 104L are supported by a gusset support member 105L. The rigidity of the joint between the rear end of the front side frame 11L and the front of the floor body 20 can thus be increased with the gussets 104L and the gusset support member 105L.

Figure 6:
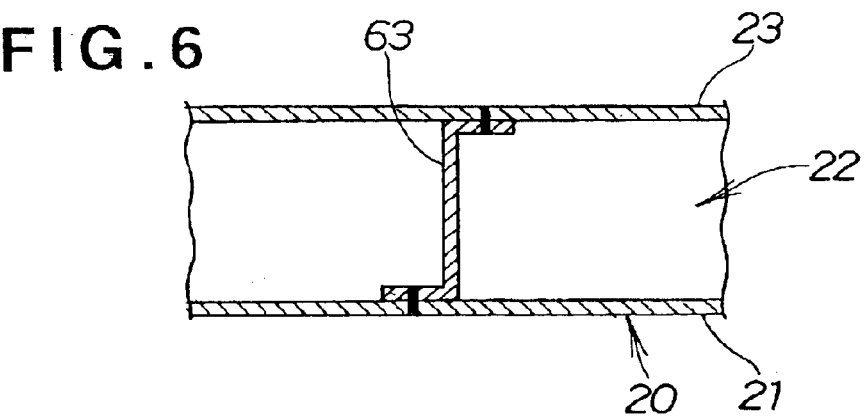
FIG. 6 is a cross-sectional view along line 6—6 in FIG. 4, illustrating that a first-section third-longitudinal core material is formed by bending.

FIG. 6 illustrates that the first-section third-longitudinal core materials 63 are plate materials bent to have a substantially Z shape in cross section. The same applies to the other longitudinal core materials 61, 62, 64 and 65 (See FIG. 3) in the first section 41.

Figure 7:
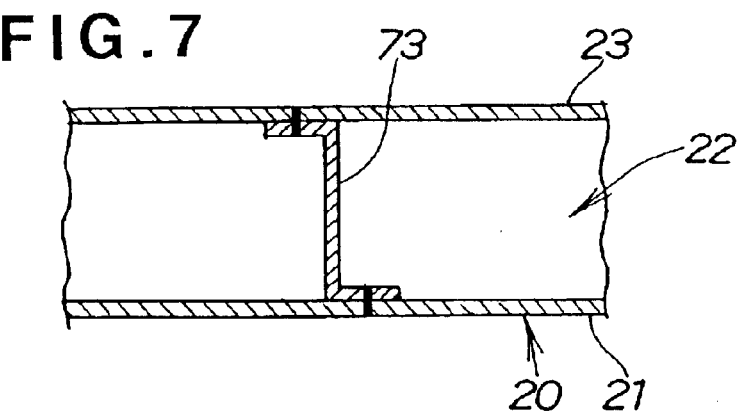
FIG. 7 is a cross-sectional view along line 7—7 in FIG. 4, illustrating that a second-section third-longitudinal core material is formed by bending.

FIG. 7 illustrates that the second-section third-longitudinal core materials 73 are plate materials bent to have a substantially Z shape in cross section. The same applies to the other longitudinal core materials 50 and the cross core materials 30 shown in FIG. 3.

Figure 8:
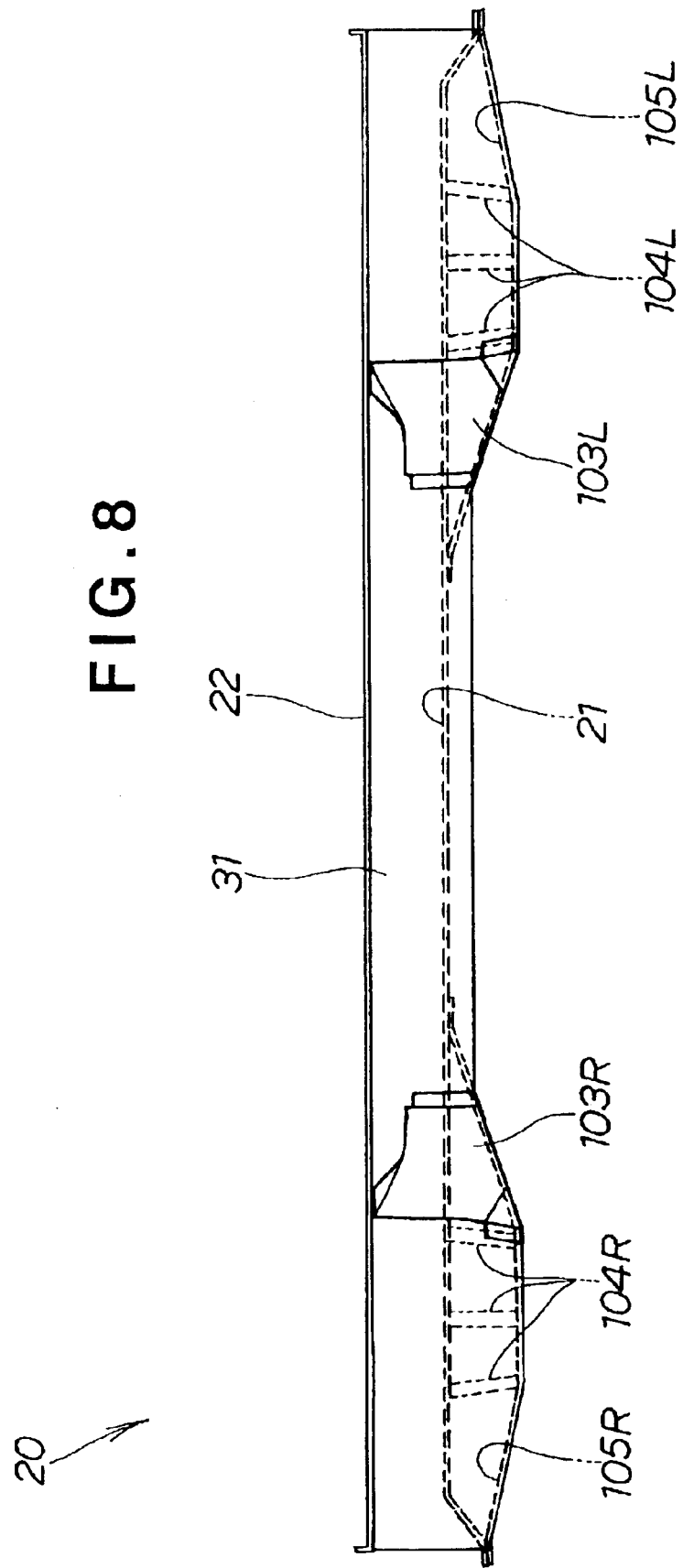
FIG. 8 is a front view of the floor body according to the invention.

FIG. 8 is a front view of the floor body according to the present invention, illustrating the configuration of the left and right support members 103L, 103R provided at the front of the floor body 20, and also illustrates the positional relationship between the gussets 104L, 104R and the left and right gusset support members 105L, 105R.

FIG. 9 illustrates in section the configuration of the floor body according to the present invention. FIG. 10 is an enlarged view of a portion 10 in FIG. 9.

In FIGS. 9 and 10, the left and right side sills 13L, 13R shown in imaginary lines have a substantially U-shaped cross section, the openings of which being faced outward of the vehicle body. Outside panels 18L, 18R are joined to the edges of the openings to constitute frame members with a substantially rectangular cross section. Reference signs 19L, 19R denote reinforcing members.

The floor body 20 is configured such that, at its left and right edge portions, the lower flat plate 21, the upper flat plate 23 and the fifth cross core members 35 are joined at their front ends to the left and right side sills 13L, 13R.

The joints at the left and right edges of the floor body 20 have a so-called box construction enclosed by the side sills 13L, 13R, the upper and lower flat plates 21, 23, the fifth cross core materials 35 disposed at the front and rear of the figure sheet, and the second-section fourth-longitudinal core materials 74. The box construction can largely increase the joint strength of the floor body 20 with respect to the side sills 13L, 13R.

Now the functions of the floor body with the above configuration will be described with reference to FIGS. 11 and 12.

Figure 11:
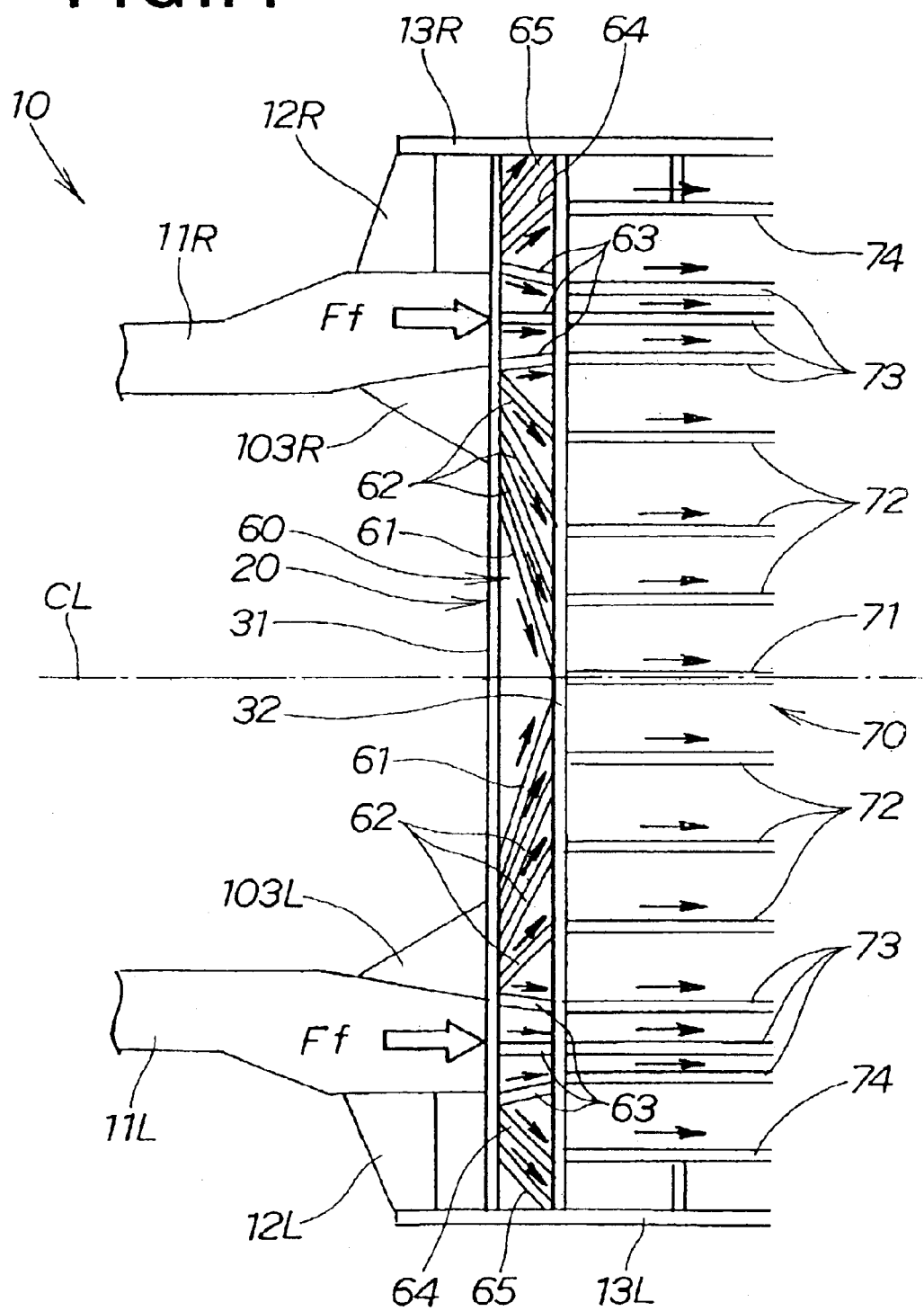
FIG. 11 is a diagram illustrating a state where impact force acts on the front of the floor body according to the invention.

As shown in FIG. 11, impact forces Ff, Ff from forward of the vehicle body act through the left and right front side frames 11L, 11R on the front of the floor body 20. The longitudinal core materials 60 (a plurality of core materials indicated by reference numerals 61 to 65) provided in a front portion of the floor body 20 are arranged to extend radially rearward and can efficiently disperse the impact forces Ff, Ff all over the floor body 20. The impact forces Ff, Ff are dispersed by the longitudinal core materials 60 extending radially rearward from the rear ends of the front side frames 11L, 11R and transmitted via the longitudinal core materials 70 (longitudinal core materials indicated by reference numerals 71 to 74) to all the other core materials.

The impact forces Ff, Ff acting on the front of the floor body 20 are thus efficiently dispersed all over the floor body 20. The entire floor body 20 sufficiently absorbs impact energy. The floor body 20 has an increased efficiency in impact energy absorption.

In addition, since the longitudinal core materials 60 provided in the front portion of the floor body 20 are arranged to extend radially rearward directly or indirectly from the rear ends of the left and right front side frames 11L, 11R, the rigidity of front mounted portions of the floor body 20 with respect to the left and right front side frames 11L, 11R is sufficiently secured.

Furthermore, upon a so-called offset collision in which an impact force Ff acts on a left- or right-eccentric position with respect to the vehicle transverse center CL, the longitudinal core materials 60, since extending radially rearward from the rear ends of the left and right front side frames 11L, 11R, function as follows.

When a left-offset collision occurs, an impact force Ff can be dispersed from the rear end of the left front side frame 11L through the longitudinal core materials 60 to the left half of the floor body 20 for transmission and also to the right half thereof. The same goes for a right-offset collision. Even upon an offset collision, the floor body 20 as a whole can thus sufficiently absorb impact energy.

Impact forces Ff, Ff acting on the front of the floor body 20 from the left and right front side frames 11L, 11R are concentrated loads. The concentrated loads are dispersed by the longitudinal core materials 60 extending radially rearward. However, load acting on the three first-section third-longitudinal core materials 63 and the three second-section third-longitudinal core materials 73 which substantially correspond to the rear end of each of the front side frames 11L, 11R is inevitably relatively greater than load acting on the other longitudinal core materials 61, 62, 64, 65, 71, 72 and 74.

For this reason, as described with FIG. 4, the present embodiment sets the plate thickness t1 of the three first-section third-longitudinal core materials 63 substantially corresponding to the rear end of each of the front side frames 11L, 11R greater than the plate thickness t2 of the other longitudinal core materials 61, 62, 64 and 65 (t1>t2).

The plate thickness t1 of the three second-section third-longitudinal core materials 73 substantially corresponding to the rear ends of the three first-section third-longitudinal core materials 63 is also set greater than the plate thickness t2 of the other longitudinal core materials 71, 72 and 74 (t1>t2). Furthermore, the arrangement pitch p1 of the three second-section third-longitudinal core materials 73 is set smaller than the arrangement pitch p2 of the other longitudinal core materials 71, 72 and 74 (P1<P2).

In this manner, only the first-section third-longitudinal core materials 63 and the second-section third-longitudinal core materials 73, which substantially correspond to the rear ends of the front side frames 11L, 11R, are increased in strength, and the strength of the other core materials is left unchanged. Increase in weight of the floor body 20 can be limited and the respective strengths of the core materials can be set in good balance. With the limited increase in weight of the floor body 20, the strength of the entire floor body 20 can thus be increased against the impact forces Ff, Ff acting from forward of the vehicle body through the left and right front side frames 11L, 11R on the front of the floor body 20. The impact forces Ff, Ff acting on the front of the floor body 20 can be more efficiently dispersed all over the floor body 20.

Figure 12:
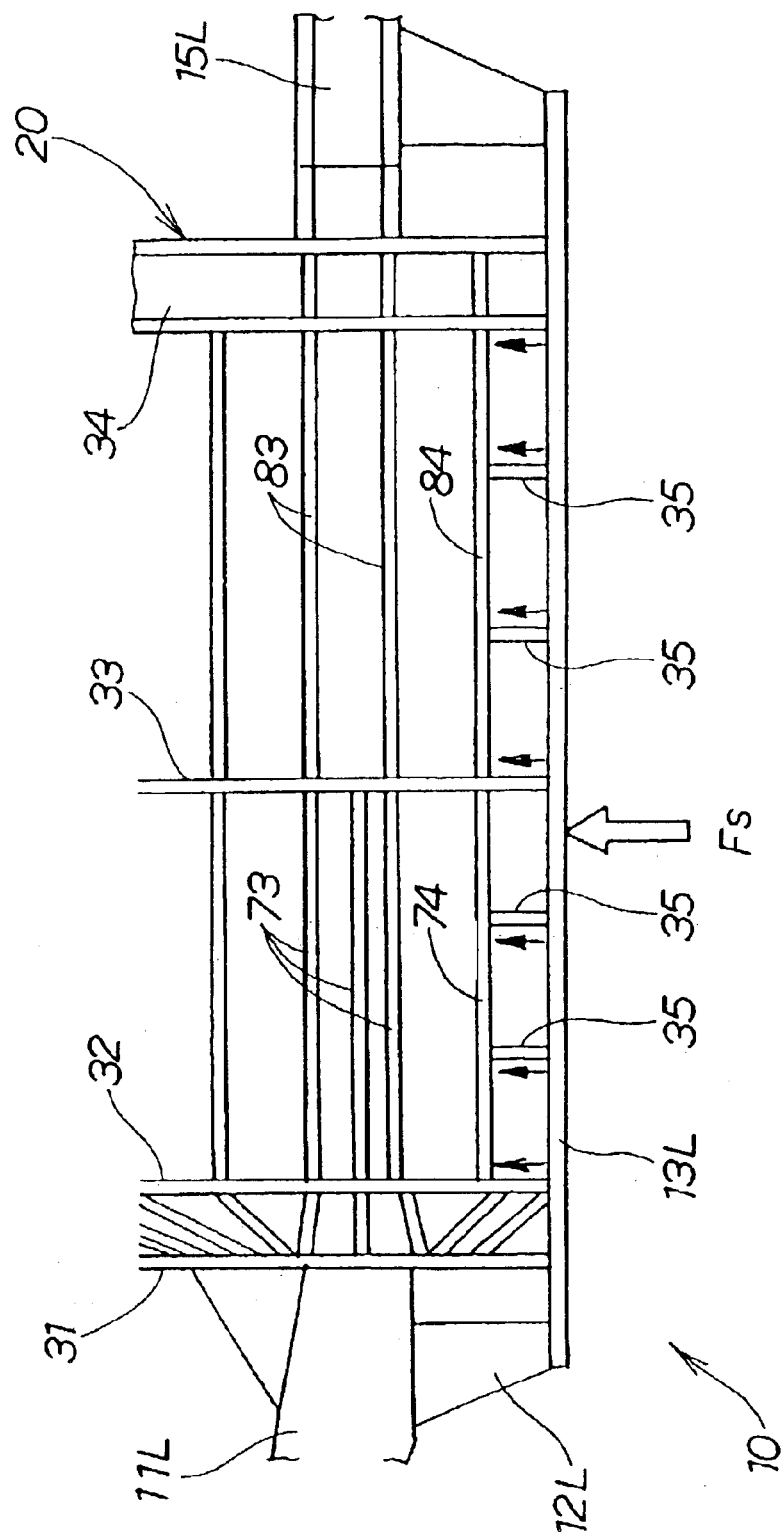
FIG. 12 is a diagram illustrating a state where impact force acts from the side of the floor body according to the invention.

As shown in FIG. 12, upon a so-called side collision in which an impact force Fs acts on the side of the left side sill 13L or the right side sill 13R (See FIG. 11), the following functions can be seen.

The impact force Fs from the left side of the vehicle body, for example, acts through the left side sill 13L on the side of the floor body 20. A plurality of core materials in a left edge portion of the floor body 20, the fifth cross core materials 35, are arranged with a fixed arrangement pitch in the vehicle longitudinal direction, extending transversely outward, and being joined at their front ends to the left side sill 13L. The impact force Fs through the side sill 13L is dispersed by the fifth cross core materials 35 and is transmitted through the second-section fourth-longitudinal core materials 74 and the third-section fourth-longitudinal core materials 84 to all the other core materials. The impact force Fs can thus be efficiently dispersed all over the floor body 20. The same is true for a right-side collision.

Even upon a side collision, the floor body 20 as a whole can thus sufficiently absorb impact energy. The floor body 20 has an increased efficiency in impact energy absorption.

In addition, the fact that the joints at the left and right edges of the floor body 20 have the box configuration as described with FIGS. 9 and 10 provides very large joint strength to the floor body 20 with respect to the side sills 13L, 13R. The impact force Fs can thus be efficiently dispersed by the entire floor body 20.

As described above, the present invention according to the present embodiment is characterized in that, as shown in FIGS. 2 and 3, the hollow panel integrally formed by arranging the core materials 22 on the flat plate 21 with spaces and placing the flat plate 23 thereover constitutes the floor body 20, and the core materials in the edge portions of the floor body 20 are joined to the body frame 10, that is, the front ends of the cross core materials 30 and the front ends of the longitudinal core materials 60 are directly or indirectly joined to the body frame 10, having the following functions and effects (1) to (4).

(1) The use of the hollow panel as the floor body (floor panel) 20 can increase the rigidity and strength of the entire floor against bending, torsion and shearing. Furthermore, the joints of the core materials in the edge portions of the floor body 20 to the body frame 10 further increase the rigidity of the entire floor body 20. The entire floor body 20 is thus increased in rigidity without being provided with a floor frame consisting of additional members for reinforcing the floor body 20. The elimination of a floor frame can further increase the degree of freedom in layout of attachments (such as an exhaust system) to the vehicle body.

(2) Impact forces Ff, Fs (See FIGS. 11, 12) acting through the body frame 10 on the floor body 20 are efficiently dispersed all over the floor body 20 with the core materials 22 spaced from one another between the upper and lower flat plates 21 and 23, so that the floor body 20 as a whole can sufficiently absorb impact energy. The floor body 20 has an increased efficiency in impact energy absorption.

The dispersion of the impact forces Ff, Fs with the core materials 22 prevents the concentration of excessive stress on a part of the floor body 20.

The arrangement of the core materials 22 largely increases the strength of the upper and lower flat plates 21 and 23 against buckling, increasing the proof stress of the floor body 20 and the vehicle compartment (cabin), increasing the amount of deformation of the front side frames 11L, 11R, and resulting in an increased energy absorption efficiency.

(3) The use of the hollow panel as the floor body 20 and the arrangement of the core materials 22 in the floor body 20 increase equally the surface rigidity of the floor body 20 and eliminate any locally-greatly-vibrating area. The vibration of the floor body 20 can thus be further reduced.

(4) The side sills 13L, 13R also serve as a frame of the floor body 20, eliminating the need for providing an additional frame member. The floor body 20 can thus be simplified, simplifying the entire configuration of the body frame 10 and reducing the weight of the body frame 10.

Figure 13:
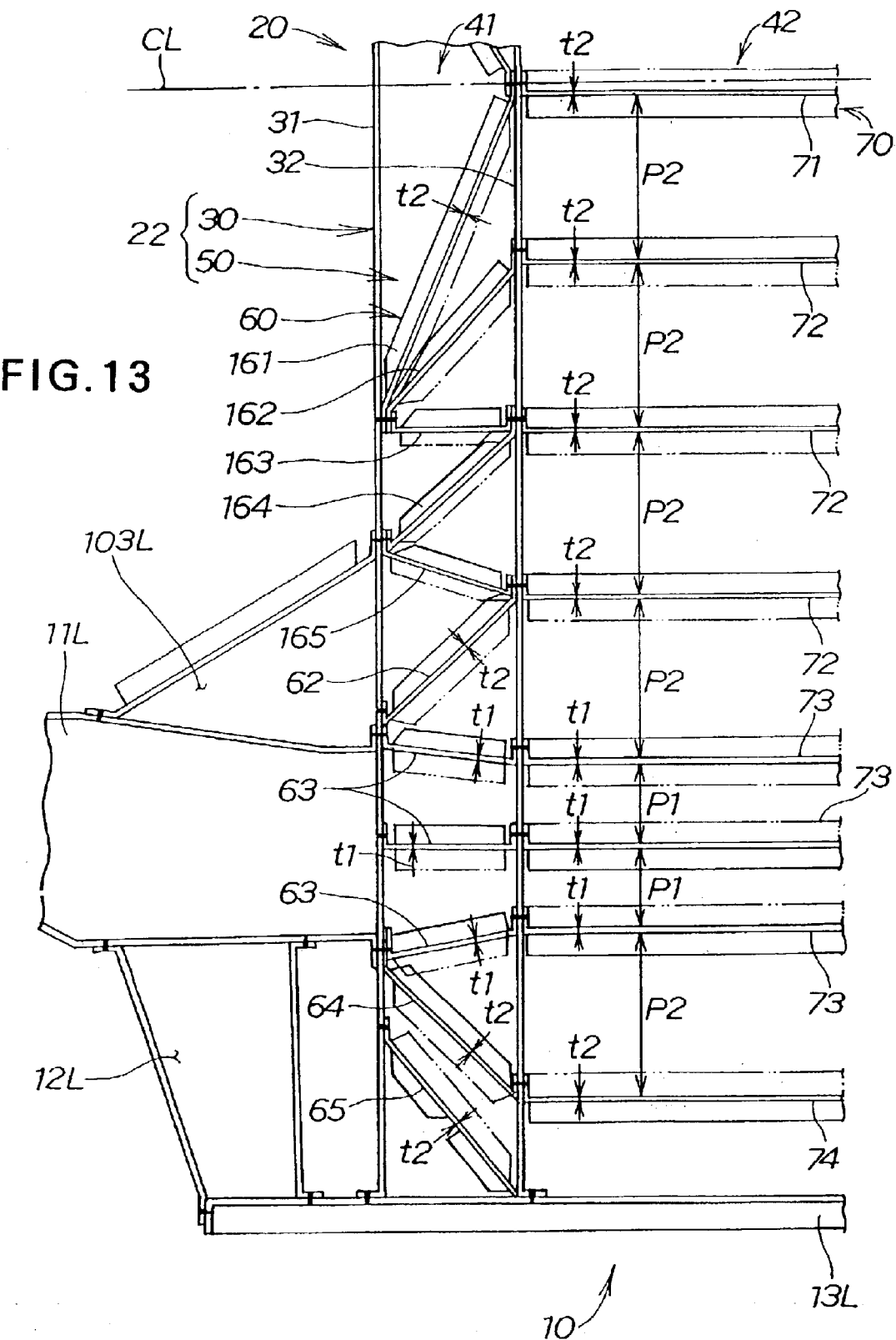
FIG. 13 is a diagram illustrating a modification of the floor body according to the invention.

FIG. 13 is a modification of the floor body of the above-described embodiment, illustrating a left front portion of a floor body 20 corresponding to FIG. 4. Longitudinal core materials 60 in a first section 41 in this modification are, like the longitudinal core materials 60 shown in FIGS. 2 to 4, arranged to extend radially rearward from the rear end of a left front side frame 11L directly or indirectly via a first cross core material 31.

More specifically, the modification shown in FIG. 13 is characterized in that, in place of the first-section first-longitudinal core material 61 and the three first-section second-longitudinal core materials 62 shown in FIG. 4, first-section first-longitudinal core materials 161 to 165 and a first-section second-longitudinal core material 62 are arranged.

The first-section second-longitudinal core material 62 in this modification extends from the rear end of the front side frame 11L to the front end of the leftmost one of three second-section second-longitudinal core materials 72.

The first-section first-longitudinal core material 165 extends from the junction between the first-section second-longitudinal core material 62 and the second-section second-longitudinal core material 72 to a rear end of a support member 103L closer to the transverse center of the vehicle.

The first-section first-longitudinal core material 164 extends from the junction between the first-section first-longitudinal core material 165 and the support member 103L to the front end of the middle one of the three second-section second-longitudinal core materials 72.

The first-section first-longitudinal core material 163 extends from the front end of the middle one of the three second-section second-longitudinal core materials 72 on an extension thereof to a forward first cross core material 31.

The first-section first-longitudinal core material 162 extends from the junction between the first-section first-longitudinal core material 163 and the first cross core material 31 to the front end of the transversely-innermost one of the three second-section second-longitudinal core materials 72.

The first-section first-longitudinal core material 161 extends from the junction between the first-section first-longitudinal core material 163 and the first cross core material 31 to the front end of a second-section first-longitudinal core material 71.

The longitudinal core materials 60 in this modification are thus the combination of the relatively short longitudinal core materials 62 to 65 and 161 to 165, extending radially rearward from the rear end of the left front side frame 11L, and being disposed with small arrangement pitches so as to be arranged in a wave-like form between the first and second cross core materials 31 and 32.

According to this modification, the arrangement (arrangement pitch) of the longitudinal core materials 60 can be more freely set than in the embodiment of FIG. 4. The arrangement in the wave-like form allows an impact force from the rear end of the left front side frame 11L to be dispersed more efficiently through the longitudinal core materials 60 all over the floor body 20. Furthermore, the short lengths of the longitudinal core materials 62 to 65 and 161 to 165 allow thin plate thickness thereof, securing the strength of the longitudinal core materials. The floor body 20 is thus reduced in weight.

Furthermore, corresponding to the arrangement pitch of the longitudinal core materials 70 in the second section 42, among the longitudinal core materials 60 in the first section 41, the arrangement pitch of the first-section third-longitudinal core materials 63 substantially corresponding to the rear end of the left front side frame 11L is set smaller than the arrangement pitches of the other longitudinal core materials 62, 64, 65 and 161 to 165. In addition, the plate thickness t1 of the first-section third-longitudinal core materials 63 is set greater than the plate thickness t2 of the other longitudinal core materials 62, 64, 65 and 161 to 165 (t1>t2).

In the modification, the joint configuration between the rear end of a right front side frame 11R (See FIG. 3) and a right front portion of the floor body 20 and the configuration of the longitudinal core materials 60 in the first section 41 are identical to those on the left side, and will not be described.

In the above-described embodiment and modification, the floor body 20 is not limited to a front floor panel and may be a rear floor panel, for example.

The core materials 61 to 65 in the front edge portion of the floor body 20 may be arranged otherwise as long as extending radially rearward directly or indirectly from the rear ends of the left and right front side frames 11L, 11R.

The joining method of the floor body 20 to the body frame 10 and the joining method of the members of the floor body 20 to one another may be any, and may be spot welding, for example.

The material of the floor body 20 may be any. For example, the lower and upper flat panels 21 and 23 may be steel plate products and the core materials 22 may be bent steel plates or molded resin products.

The shape, size and arrangement pitch of the core materials 22 may be any. The core materials 22 may be in a honeycomb shape.

The present disclosure relates to the subject matter of Japanese Patent Application No. 2002-014661, filed Jan. 23, 2002, the disclosure of which is expressly incorporated herein by reference in its entirety.

What is claimed is:

1. A vehicle floor structure, comprising:
   a body frame; and
   a floor body of a hollow panel having a first flat plate, a plurality of core materials arranged with spaces on said first flat plate, and a second flat plate placed over said core materials,
   wherein core materials in edge portions of said floor body are joined to said body frame, and
   wherein said core materials include a plurality of longitudinal core materials extending in a longitudinal direction of a vehicle and arranged side by side in a transverse direction of the vehicle, and a plurality of cross core materials extending in the transverse direction of the vehicle and arranged side by side in the longitudinal direction of the vehicle along a left edge portion and a right edge portion of the edge portions of the floor body.

2. A vehicle floor structure as set forth in claim 1, wherein said body flame includes left and right front side frames, left and right side sills and right and left rear side frames, and said floor body has a quadrangular shape and enclosed with rear ends of the left and right front side frames, the left and right side sills, and front ends of the left and right rear side frames.

3. A vehicle floor structure as set forth in claim 2, wherein a part of said longitudinal core materials disposes in a front edge portion of said floor body are arranged to extend radially rearward direction or indirectly from the rear ends of said left and right front side frames.

4. A vehicle floor structure as set forth in claim 3, wherein another part of said longitudinal core materials substantially corresponding to the rear ends of said left and right front side frames has a thickness larger than a thickness of the rest of the longitudinal core materials.

5. A vehicle floor structure as set forth in claim 3, wherein another part of said longitudinal core materials substantially corresponding to the rear ends of said left and right front side frames arranged at a pitch smaller than a pitch of the rest of the longitudinal core materials.

6. A vehicle floor structure as set forth in claim 5, wherein said another part of the longitudinal core materials substantially corresponding to the rear ends of said left and right front side frames has a thickness larger than a thickness of the rest of the longitudinal core materials.

7. A vehicle floor structure as set forth in claim 1, wherein a part of said cross core materials extends across a width of the floor body, and said longitudinal core materials and the cross core materials are assembled together into a lattice.

8. A vehicle floor structure as set forth in claim 7, wherein said body frame includes left and right front side frames, left and right side sills and right and left rear side frames, said floor body has a quadrangular shape and enclosed with rear ends of the left and right front side frames, the left and right side sills, and front ends of the left and right rear side frames, and said cross core materials are joined to the rear ends of the left and right from side frames, the left and right side sills, and the front ends of the left and right rear side frames.

9. A vehicle floor structure as set forth in claim 8, wherein a part of said longitudinal core materials disposed in a front edge portion of said floor body are arranged to extend radially rearward directly or indirectly from the rear ends of said left and right front side frames.

10. A vehicle floor structure as set forth in claim 9, wherein another part of said longitudinal core materials substantially corresponding to the rear ends of said left and right front side frames has a thickness larger than a thickness of the rest of the longitudinal core materials.

11. A vehicle floor structure as set forth in claim 9, wherein another part of said longitudinal core materials substantially corresponding to the rear ends of said left and right front side frames is arranged at a pitch smaller than a pitch of the rest of the longitudinal core materials.

12. A vehicle floor structure as set forth in claim 11, wherein said another part of said longitudinal core materials substantially corresponding to the rear ends of said left and right front side frames has a thickness larger than a thickness of the rest of the longitudinal core materials.

13. A vehicle floor structure, comprising:
   a body frame including left and right front side frames extending in a longitudinal direction of the body frame, said left and right front side frames having rear ends; and
   a floor body of a hollow panel having a first flat plate, a plurality of first, second, and third core materials in first, second, and third sections, respectively, and a second flat plate placed over said first, second, and third core materials, said floor body further including first, second, and third cross core materials separating said rear ends of said left and right front side frames from said first section first core materials, separating said first section first core materials from said second section second core materials, and separating said second section second core materials from said third section third core materials, respectively, said first core materials in said first section arranged to extend radially rearward directly or indirectly from the rear ends of said left and right front side frames;

wherein said floor body has a front end connected to rear ends of said left and right front side frames of said body frame.

14. A vehicle floor structure as set forth in claim 13, wherein said second core materials are formed by bending plate materials, and a part of said bent plate materials extend in the longitudinal direction of the vehicle and substantially correspond to the rear ends of said left and right front side frames and have a thickness larger than a thickness of the rest of the bent plate materials.

15. A vehicle floor structure as set forth in claim 13, wherein said second core materials extend in the longitudinal direction of the vehicle and are arranged side by side in a transverse direction of the vehicle, and ends of same of said second core materials substantially correspond to the rear ends of said left and right front side frames is arranged at a pitch smaller than a pitch of the rest of the longitudinal second core materials.

16. A vehicle floor structure as set forth in claim 15, wherein said second core materials are formed by bonding plate materials, and a part of said bent plate materials extend in the longitudinal direction of the vehicle and substantially correspond to the rear ends of said left and right front side frames and have a thickness larger than a thickness of the rest of the bent plate materials.

* * * * *